Nov. 30, 1926.                              1,608,523
P. A. PERMAN
GLARESHIELD
Filed Jan. 19, 1925
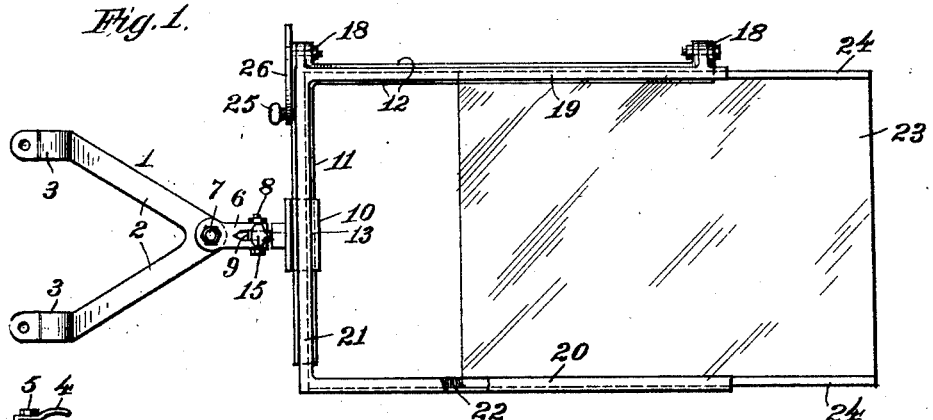
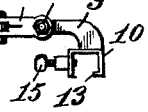
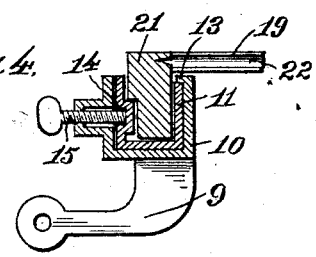
Inventor
Paul A. Perman
By Joshua R. H. Potts
Attorney Patented Nov. 30, 1926.

1,608,523

UNITED STATES PATENT OFFICE.

PAUL A. PERMAN, OF WEST WINFIELD, PENNSYLVANIA, ASSIGNOR OF FORTY PER CENT TO FRANK SEPICH, OF WEST WINFIELD, PENNSYLVANIA.

GLARESHIELD.

Application filed January 19, 1925. Serial No. 3,428.

My invention relates to glare shields for automobiles; that is, to devices to shield the eyes of a driver from the glare of the headlights of an approaching automobile.

The object of my invention is to provide a glare shield for the purpose mentioned, which shall be of small size and yet efficient to protect the eyes of the driver from the glare of the headlights of automobiles approaching from the opposite direction. A further object of my invention is to provide a device as mentioned which may be readily adjusted to position the shield in proper relation to the driver. A further object of my invention is to provide a device as mentioned which may be readily attached to any automobile. Other objects will appear hereinafter.

With these objects in view my invention consists generally in a glare shield comprising a bracket equipped with means for attaching the same to an automobile, a frame adjustably mounted on said bracket and a shield proper hingedly mounted upon said frame. My invention further consists in a device as mentioned in which said frame is mounted for vertical adjustment on the bracket and also equipped with a hinged connection between the bracket and frame, whereby the shield may be swung laterally entirely out of the line of vision of the driver, or may be swung upwardly for the same purpose. My invention further consists in a hingedly mounted supporting frame for the glare shield, and a glare shield mounted to slide laterally therein. My invention further consists in various details of construction and arrangement of parts all as will be fully described hereinafter and particularly pointed out in the claims.

My invention will be more readily understood by reference to the accompanying drawings forming a part of this specification and in which—

Fig. 1 is an elevation of a glare shield embodying my invention in its preferred form, Fig. 2 is a top plan view of the bracket, Fig. 3 is a side elevation of the device with the bracket removed, Fig. 4 is a section on the line 3—3 of Fig. 1 looking in the direction of the arrow, and illustrated upon an enlarged scale, Fig. 5 is a view similar to Fig. 4, illustrating a slightly modified form, and Fig. 6 is a detail view of the end of the bracket when the same is constructed for attachment to the frame of a sedan or closed car.

Referring now to the drawings, 1 indicates a bracket for attaching the glare shield to an automobile. This comprises a pair of divergent legs 2 terminating in curved or recessed ends 3, forming part of a clamp for attaching the device to the vertical frame portion of a wind shield. 4 indicates the other portion of the clamp secured thereto by a bolt 5. To the inner end of the bracket where, the legs 2 converge, a link 6 is pivotally connected thereto on a horizontal axis by an adjusting bolt 7. The opposite end of the link 6 is pivotally connected on a vertical axis, formed by a bolt 8, to an arm 9 on a guide block 10.

The guide block 10 is vertically elongated, and slidably mounted within the same is the vertical portion of the main frame of the glare shield. Said main frame comprises a vertical bar 11 and a horizontal extending arm 12 adjacent the upper end thereof. The vertical bar 11 comprises a channel member held within the guide block 10 by a flange 13 engaging the outer edge of one side of the channel, as indicated clearly in Figs. 4 and 5. The opposite side of the channel member 11 is preferably provided with a groove 14 to receive the end of a setscrew 15 threaded through the block 10 and adapted to lock the bar 11 in vertically adjusted position. If preferred, the member 11 may be provided with a longitudinally disposed rib 16, as illustrated in Fig. 5, working in a corresponding groove 17 in the adjacent wall of the block 10. A setscrew 15' holds the bar 11 in an adjusted position as in the previously described form. Hingedly connected to the member 12 of the main frame, as at 18, is an auxiliary frame comprising the horizontal top and bottom bars 19 and 20 respectively and a vertical inner bar 21. The auxiliary frame therefore constitutes a U-shaped member with the open side opposite or away from the bracket 1. The members 19 and 20 are U-shaped in cross section forming grooves 22 in which is slidably mounted the glare shield proper 23. This is formed of any suitable transparent colored material and its upper and lower edges are preferably reinforced as at 24. It will be noted that the vertical bars 21 of the U-shaped auxiliary frame are of greater depth than the horizontal bars for strength of construction, and when the auxiliary frame is swung downwardly the major portion of said member 21 folds within the channel members of the main frame as clearly illustrated in Figs. 4 and 5.

In Fig. 6 I have illustrated a slight modification, wherein the ends of the bracket legs terminate in flat portions 3′ which are perforated to receive attaching screws. This form of device is used for attaching the glare shield to the frame of a closed car.

It is obvious that the device may be readily attached to an automobile; and it is made of small size so that it will not interfere with the general vision of the driver, but is only large enough to protect the eyes from the glare of an oncoming machine. It is on account of the small size of the device that it is made adjustable so that the shield proper, 23, may be readily positioned in proper relation to the driver to protect the eyes without interfering with his vision at other angles. It will be readily seen that the main frame may be readily adjusted vertically in the block 10 and held in the adjusted position by the set screw 15. The shield proper may be readily slid laterally in the auxiliary frame as is obvious so as to position the same laterally. When desired the auxiliary frame, with the shield 23, may be swung upwardly on the hinges 18 and may be held at any desired angle by the setscrew 25 extending through the slotted arcuate member 26. See Figs. 1 and 3.

When the auxiliary frame is swung upwardly to the full limit, it is usually sufficiently elevated to avoid annoying the driver. However, if it is desired to swing the device higher, this may be done by swinging the device on the pivot 7; or if desired the device may be swung to the left of the driver, on the pivot 8.

The device above described is of small size and light in weight and may be readily attached to any automobile and quickly adjusted to the proper position for service. Also, it may be readily swung into a convenient position to be out of the way of the driver, when not in use.

I claim:

1. A glare shield for automobiles comprising a bracket, means for attaching the same to the automobile and a vertical guide block thereon, in combination with a main frame vertically adjustable on said guide, an auxiliary frame hingedly mounted on the main frame, means for holding said auxiliary frame in adjusted position and a glare shield carried by said auxiliary frame and adapted to slide laterally therein, substantially as described.

2. A glare shield comprising a bracket, a guide block carried thereby, a main frame comprising a horizontal member and a vertical member adjustably mounted in said block, a U-shaped auxiliary frame hingedly mounted on said horizontal member of the main frame and a glare shield slidably mounted therein, substantially as described.

3. A glare shield comprising a bracket, a guide block carried thereby, a main frame comprising a vertical bar adjustably mounted in said guide block and a horizontal arm, a U-shaped auxiliary frame hingedly attached to said horizontal arm of the main frame and open at one side, and a shield laterally slidable in said auxiliary frame, substantially as described.

4. A glare shield comprising a bracket, a U-shaped guide block carried thereby, a main frame comprising a vertical bar adjustably mounted in said adjustable guide block, and a horizontal arm, said vertical bar being U-shaped in cross-section, a U-shaped auxiliary frame comprising a vertical member and upper and lower horizontal members, the upper horizontal member being hingedly attached to said horizontal arm of the main frame and open at one side, the vertical member of the auxiliary frame being adapted to fold into the vertical member of the main frame, and a shield laterally slidable in said auxiliary frame, substantially as described.

5. A device as set forth in claim 3 further characterized by means for holding the auxiliary frame in adjusted position.

In testimony whereof I have signed my name to this specification.

PAUL A. PERMAN.